(12) United States Patent
Dall'Occo et al.

(10) Patent No.: US 6,664,351 B1
(45) Date of Patent: Dec. 16, 2003

(54) ETHYLENE COPOLYMERS, PROCESS FOR THE PREPARATION OF ETHYLENE-BASED POLYMERS AND CATALYST SYSTEM USED THEREIN

(75) Inventors: Tiziano Dall'Occo, Ferrara (IT); Luigi Resconi, Ferrara (IT); Giulio Balbontin, Ferrara (IT); Enrico Albizzati, Arona (IT)

(73) Assignee: Basell Technology Company B.V., Hoofddorp (NL)

( * ) Notice: Subject to any disclaimer, the term of this patent is extended or adjusted under 35 U.S.C. 154(b) by 491 days.

(21) Appl. No.: 09/603,139

(22) Filed: Jun. 23, 2000

Related U.S. Application Data (62) Division of application No. 08/486,602, filed on Jun. 7, 1995, now Pat. No. 6,136,936.

(30) Foreign Application Priority Data

Jun. 20, 1994 (IT) .......................................... MI94A1279

(51) Int. Cl.[7] .................................................. C08F 4/42
(52) U.S. Cl. ....................... 526/160; 526/348; 526/943; 526/348.2; 526/348.3; 526/348.6; 526/151; 502/152; 502/103
(58) Field of Search ................................ 526/160, 943, 526/348, 348.2, 348.3, 348.6, 151; 502/152, 103

(56) References Cited

U.S. PATENT DOCUMENTS

| | | | |
|---|---|---|---|
| 4,701,432 A | | 10/1987 | Welborn, Jr. |
| 5,084,534 A | | 1/1992 | Welborn, Jr. et al. |
| 5,086,134 A | * | 2/1992 | Antberg et al. ............. 526/126 |
| 5,218,071 A | * | 6/1993 | Tsutsui et al. .............. 526/348 |
| 5,229,022 A | | 7/1993 | Song et al. |
| 5,240,894 A | | 8/1993 | Burkhardt et al. |
| 5,475,075 A | * | 12/1995 | Brant et al. ............. 526/348.3 |
| 5,798,427 A | | 8/1998 | Foster et al. |
| 5,852,143 A | | 12/1998 | Sishta et al. |

FOREIGN PATENT DOCUMENTS

| | | | |
|---|---|---|---|
| AU | B- 44591/93 | * | 2/1994 |
| EP | 0 128 045 | | 12/1984 |
| EP | 0 399 348 A2 | | 11/1990 |
| EP | 0 426 396 | | 5/1991 |
| EP | 0 436 399 | | 7/1991 |
| EP | 0 439 964 | | 8/1991 |
| EP | 0 447 035 | | 9/1991 |
| EP | 0 516 458 | | 12/1991 |
| EP | 0 485 823 | | 5/1992 |
| EP | 0 516 018 | | 12/1992 |
| EP | 0 530 647 | | 3/1993 |
| EP | 0 537 686 | | 4/1993 |
| EP | 0 545 303 | | 6/1993 |
| EP | 0 569 249 | | 11/1993 |
| EP | 0 584 609 | | 3/1994 |
| EP | 0 589 364 | * | 3/1994 |
| EP | 0 601 495 | | 6/1994 |
| EP | 0 605 952 | | 7/1994 |
| EP | 0 628 565 A1 | | 12/1994 |
| EP | 0 633 272 | | 1/1995 |
| EP | 0 643 078 | | 3/1995 |
| WO | WO 92/00333 | | 1/1992 |
| WO | WO 93/03093 | | 2/1993 |
| WO | WO 93/09148 | | 5/1993 |
| WO | WO 94/10256 | | 5/1994 |
| WO | WO 95/04761 | | 2/1995 |
| WO | WO 97/28170 | | 8/1997 |
| WO | WO 98/46616 | | 10/1998 |

OTHER PUBLICATIONS

Hawley's Condensed Chemical Dictionary, 11th ED. Van Nostrand Reinhold, New York, 1987, 352, 1083–1084.
Kelusky, et al., Polymer Engineering and Science, vol. 27, No. 20, pp. 1562–1571 (1987).
Chen, et al., "1.3–Propanediyl) silylene–bis(1–indenyl) dichlorozirconium. Synthesis and polymerization catalysis." Journal of Organometallic Chemistry, vol. 487, pp. 29–34 (1995).
Comparison of Zirconocene and hafnocene catalysts for the polymerization of ethylene and 1–butene; K. Heiland, and W. Kaminsky; Makromol. Chem., vol. 193, pp. 601–610 (1992).
"Determination of Branching Distributions in Polyethine and Ethylene Copolymers"; L. Wild, T.R. Ryle, D.C Knobeloch, and I.R. Peak; J. Polymer Science: Polymer Physics Edition, vol. 20, pp. 441–445 (1982).
Derwent English language abstract of DE 3916555 (an equivalent to EP 0 399 348 A2, document 42 above).
G. Capaccio and C.J. Frye, "The Structure and Melting Behavior of LLDPE," Polycon '84—papers and proceedings, pp. 128–131, Wed. 9–Fri. 11, May 1984.
Details of sales by product family for Grade Vistalon 8731. Test polymerization with rac and rac/meso ethylenebis(2–dimethyltertbutylsiloxy–indenyl)zirconium dichloride.
Published Italian Application No. MI 93 A/01467 (Jul. 1993).

* cited by examiner

Primary Examiner—Ling-Siu Choi
(74) Attorney, Agent, or Firm—Bryan Cave LLP (57) ABSTRACT

Ethylene copolymers are prepared with comonomers selected from:
(a) α-olefins,
(b) cycloolefins and
(c) polyenes,
with a content of ethylene units of between 80 and 99 mol %, a content of units derived from α-olefin, cycloolefin and/or polyene comonomers of between 1 and 20 mol %, characterized in that:
(a) in TREF (Temperature Rising Elution Fractionation) analysis, a quantity equal to at least 90% by weight of the copolymer is eluted within a temperature interval of less than 50° C., and
(b) $M_w/M_n > 3$, where $M_w$ is the weight-average molecular weight and $M_n$ is the number-average molecular weight, both determined by means of GPC.

12 Claims, 3 Drawing Sheets

ETHYLENE COPOLYMERS, PROCESS FOR THE PREPARATION OF ETHYLENE-BASED POLYMERS AND CATALYST SYSTEM USED THEREIN

CROSS REFERENCE TO RELATED APPLICATIONS

This application is a divisional of U.S. Ser. No. 08/486,602 filed Jun. 7, 1995 now U.S. Pat. No. 6,136,936.

The present invention relates to ethylene copolymers and in particular to ethylene copolymers provided with a uniform distribution of the comonomer units within the polymer chain and with a wide molecular weight distribution. This invention also relates to a process for the preparation of ethylene-based polymers and to the catalytic system used in this process.

It is known that polyethylene can be modified by the addition, during the polymerization reaction, of small quantities of α-olefins, generally 1-butene, 1-hexene or 1-octene. This gives LLDPE (linear low density polyethylene) copolymers which have short branches along the main chain due to the units derived from the α-olefin comonomers.

These branches have the effect that the degree of crystallinity and hence the density of the copolymer turn out to be lower than in the polyethylene homopolymer. Typically, the LLDPE copolymers have densities of the order of 0.910–0.940 g/cm$^3$. Consequently, the LLDPE copolymers have optimum mechanical properties, in particular for the production of films.

The lowering of the degree of crystallinity and of the density of the copolymers is a function of the type and quantity of the incorporated α-olefin. In particular, the greater the quantity of incorporated α-olefin, the lower are the resulting degrees of crystallinity and density.

The properties of the copolymer depend, apart from the type and quantity of the incorporated α-olefin comonomer, also oil the distribution of the branches along the polymer chain. In particular, the greater uniformity of the distribution of the branches has a positive effect on the properties of the copolymers. In fact, with the same type and quantity of incorporated α-olefin, a higher uniformity of distribution allows lower degrees of crystallinity and density to be obtained.

LLDPE copolymers prepared with conventional Ziegler-Natta catalysts are characterized by a poor uniformity of composition distribution, and in particular by the presence of consecutive units of comonomers in the polymer chain and by long sequences of ethylene units. To obtain copolymers with sufficiently low density and crystallinity, it is therefore necessary to use large quantities of α-olefin comonomer.

The use of catalysts based on metallocene compounds has made it possible to obtain LLDPE copolymers having an improved uniformity of composition. These copolymers, of the same chemical composition, are endowed with superior properties as compared with traditional copolymers.

The copolymers obtained with metallocene catalysts have, however, a narrow molecular weight distribution (MWD). This expresses itself in poor processability properties, and this can be disadvantageous in particular in some applications, such as the use for films.

With the purpose of overcoming this disadvantage, processes for the preparation of LLDPE copolymers have been proposed, which are carried out in the presence of a catalyst consisting of a metallocene compound and a non-metallocene titanium compound.

U.S. Pat. No. 4,701,432 describes, for example, the preparation of LLDPE in the presence of a catalytic component consisting of bis(cyclopentadienyl)zirconium dichloride and titanium tetrachloride, supported on silica.

European Patent Application EP 439,964 describes the preparation of LLDPE in the presence of a catalyst consisting of a metallocene compound and a compound based on titanium, magnesium and a halogen.

Nevertheless, the LLDPE copolymers thus obtained, though having a broad molecular weight distribution, do not have a satisfactory distribution of the comonomers within the polymer chain.

Another proposed system is that which provides for the use of catalysts consisting of two different metallocene compounds.

K. Heiland and W. Kaminsky in "Makromol. Chem. 193, 601–610 (1992)" describe the copolymerization reaction of ethylene with 1-butene in the presence of a catalyst consisting of a mixture of rac-ethylenebis(indenyl)zirconium dichloride and rac-ethylenebis(indenyl)hafnium dichloride. The copolymers obtained with this catalyst are provided with a substantially bimodal molecular weight distribution. Nevertheless, the regularity in the distribution of the comonomers across the various polymer chains does not yet reach a high level. This is due to the fact that the values of the copolymerization parameters $r_1$ and $r_2$, characteristic of the zirconocene and hafnocene used, differ widely from one another, as reported on page 607 of the above publication.

It would therefore be desirable to obtain an LLDPE copolymer which has an extremely uniform distribution of the comonomer units in the polymer chain and at the same time a broad molecular weight distribution.

Stereorigid metallocenes are generally prepared as a mixture of the racemic and meso form. The meso form is generally removed by separation from the rac/meso mixtures, since only the chiral racemic form is stereospecific. Only a few disclosures are known of the use of the meso form in the polymerization of olefins.

European Patent Application EP 584,609 discloses the use of a particular class of bridged bis-indenyl metallocenes in the meso form or in a meso/rac mixture for the preparation of atactic polyolefins having high molecular weight and a narrow molecular weight distribution ($M_w/M_n \leq 4$). In particular, homo- and copolymers of propylene were prepared.

European Patent Application EP 643,078 describes the preparation of ethylene-based polymers endowed with very high molecular weights and narrow molecular weight distribution, by carrying out the polymerization reaction in the presence of a metallocene-based catalyst wherein the metallocene is stereorigid and it is in its meso isomeric form.

Surprisingly, the applicant has now found that it is possible to prepare LLDPE copolymers having a uniform distribution of the comonomer units along the polymer chain and a broad molecular weight distribution, as well as other ethylene-based polymers, by carrying out the polymerization reaction in the presence of a catalyst consisting of a mixture of the racemic and meso isomers of a stereorigid metallocene compound.

An object of the present invention is therefore an ethylene copolymer with at least one comonomer selected from:
  (a) α-olefins of the formula $CH_2=CH-CH_2R$, where R is hydrogen or a linear, branched or cyclic alkyl radical having 1 to 20 carbon atoms,
  (b) cycloolefins and
  (c) polyenes,
with a content of units derived from α-olefin, cycloolefin and/or polyene comonomers of between 1 and 20 mol %, preferably between 2 and 15 mol %, characterized in that:
  (a) in TREF (Temperature Rising Elution Fractionation) analysis, a quantity equal to at least 90% by weight of the copolymer is eluted in a temperature interval of less than 50° C., and (b) $M_w/M_n > 3$, where $M_w$ is the weight-average molecular weight and $M_n$ is the number-average molecular weight, both determined by GPC.

The TREF analysis, carried out as described by L. Wild, T. R. Ryle, D. C. Knobeloch and I. R. Peak in J. Polymer Science: Polymer Physics Edition, Vol. 20, 441–455 (1982), provides information on the length of the ethylene sequences and consequently on the distribution of the comonomer units within the polymer chain.

In fact, this method makes it possible to fractionate the copolymers on the basis of their crystallisability and hence on the basis of the ethylene sequences between two branches due to the α-olefin units present in the chain. The more uniform the distribution of the α-olefin units, the more restricted is the resulting temperature interval, in which the polymer is eluted.

The molecular weights of the copolymers of the invention are distributed within a relatively wide interval.

One indication of the molecular weight distribution is given by the ratio $M_w/M_n$ which, for the copolymers of the invention, is generally greater than 3, preferably greater then 4 and more preferably greater than 5.

Further information on the molecular weight distribution in the copolymers of the invention is obtainable from the measurement of the melt index. In particular, the values of the ratio of the melt indices F/E, where the condition F involves a load of 21.6 kg, while the condition E involves a load of 2.16 kg, prove to be high. For MIE values of about 0.4, there are values of the MIF/MIE ratio which are generally higher than 50, preferably higher than 70 and more preferably higher than 100.

The resulting melting point of the copolymers of the invention, which is a function of the type and quantity of comonomer, is generally below 120° C. and can reach values below 100° C.

The resulting density of the copolymers of the invention, which is also a function of the type and quantity of comonomer, is generally below 0.94 g/cm³ and can reach values below 0.90 g/cm³.

In particular, according to another aspect of the present invention, the latter relates to an ethylene copolymer with 1-butene with a content of units derived from 1-butene of between 1 and 20 mol %, characterized in that (a) the percentage by weight of 1-butene (% B), determined by $^{13}C$-NMR analysis, and the density (D) of the copolymer satisfy the following relationship:

% B+285 D≦272

(b) $M_w/M_n > 3$, where $M_w$ is the weight-average molecular weight and $M_n$ is the number-average molecular weight, both determined by GPC.

The copolymers according to the invention are further characterized by relatively low values of the solubility in xylene at 25° C., which are generally below 10% by weight and can reach values below 5% by weight.

The copolymers of the invention have values of intrinsic viscosity (I.V.) generally higher than 0.5 dl/g and preferably higher than 1.0 dl/g. The intrinsic viscosity can reach values of 2.0 dl/g and beyond.

Examples of α-olefins of the formula $CH_2=CH-CH_2R$ which can be used as comonomers in the copolymers of the invention are propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene, 1-eicosene and allylcyclohexane. Preferably, 1-butene, 1-hexene or 1-octene and more preferably 1-butene are used.

Examples of cycloolefins are cyclopentene, cyclohexene and norbornene.

The copolymers can also contain units derived from polyenes, in particular conjugated or non-conjugated linear or cyclic dienes such as, for example, 1,4-hexadiene, isoprene, 1,3-butadiene, 1,5-hexadiene and 1,6-heptadiene.

In the case of polyenes other than non-conjugated α,ω-diolefins having 6 or more carbon atoms, these are preferably used in quantities of between 0 and 3 mol % as a second α-olefin comonomer.

A further object of the present invention is a process for the preparation of ethylene polymers, comprising the polymerization reaction of ethylene in the presence of a catalyst consisting of the reaction product of:

(A) a mixture of the racemic and meso isomers of a stereorigid metallocene compound of a transition metal, belonging to Groups III, IV or V or the lanthanides in the Periodic Table of the Elements, with two cyclopentadienyl ligands connected to each other by a chemical bridge, and (B) at least one co-catalyst capable of activating both the racemic form and the meso form of the metallocene compound, selected from the alumoxanes and the compounds capable of forming an alkylmetallocene cation.

The ethylene polymerization reaction can be carried out in the presence of at least one comonomer selected from α-olefins of the formula $CH_2=CH-CH_2R$, where R is a linear, branched or cyclic alkyl radical having 1 to 20 carbon atoms, cycloolefins and/or polyenes. In this way, it is possible to prepare ethylene copolymers which are the subject of the present invention.

The racemic form and the meso form of the metallocene compound are present in a weight ratio of between 99:1 and 1:99 respectively.

Stereorigid metallocene compounds which can be used in the process of the present invention are those of the formula (I):

in which M is a metal selected from Ti, Zr and Hf, the substituents $R^1$ are $C_1-C_{20}$-alkyl radicals, $C_3-C_{20}$-cycloalkyl radicals, $C_2-C_{20}$-alkenyl radicals, $C_6-C_{20}$-aryl radicals, $C_7-C_{20}$-alkylaryl radicals or $C_7-C_{20}$-arylalkyl radicals and can contain atoms of Si or Ge;

the substituents $R^2$ and $R^3$ are hydrogen atoms, $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals or $C_7$–$C_{20}$-arylalkyl radicals and can contain atoms of Si or Ge;

if the substituents $R^2$ are other than hydrogen, the substituents $R^1$ and $R^2$ on the same cyclopentadienyl can form a ring containing 5 to 20 carbon atoms;

$R^4$ is a divalent group selected from $(CR^5{}_2)_n$, $(SiR^5{}_2)_n$, $(GeR^5{}_2)_n$, $NR^5$ or $PR^5$, where the substituents $R^5$ which can be equal or different are hydrogen atoms $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals or $C_7$–$C_{20}$-arylalkyl radicals and, if $R^4$ is $(CR^5{}_2)_n$, $(SiR^5{}_2)_n$, or $(GeR^5{}_2)_n$, two substituents $R^5$ on the same carbon, silicon or germanium atom can form a ring containing 3 to 8 atoms, n being an integer of between 1 and 4, preferably 1 or 2;

the substituents $X^1$ and $X^2$ are hydrogen or halogen atoms, $R^6$, $OR^6$, $SR^6$, $NR^6{}_2$ or $PR^6{}_2$, where the substituents $R^6$ which can be equal or different are $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals or $C_7$–$C_{20}$-arylalkyl radicals and can contain atoms of Si or Ge.

Those sterorigid metallocene compounds are preferred which are of the formula (II)

(II)

and of the formula (III)

(III)

where, in the formulae (II) and (III), M, $R^3$, $R^4$, $X^1$ and $X^2$ are defined above and the substituents $R^7$ are hydrogen, $C_1$–$C_{10}$-alkyl radicals, $C_3$–$C_{10}$-cycloalkyl radicals, $C_2$–$C_{10}$-alkenyl radicals, $C_6$–$C_{10}$-aryl radicals, $C_7$–$C_{10}$-alkylaryl radicals or $C_7$–$C_{10}$-arylalkyl radicals and can contain atoms of Si or Ge and, furthermore, two adjacent substituents $R^7$ can form a ring having 5 to 8 carbon atoms.

Those stereorigid metallocene compounds of the formula (II) or (III) are particularly suitable in which M is Zr, the substituents $R^3$ are hydrogen atoms or $C_1$–$C_2$-alkyl, the substituents $R^7$ are hydrogen or methyl groups, the substituents $X^1$ and $X^2$ are chlorine or methyl groups and the group $R^4$ is a $(CH_2)_2$ or $Si(CH_3)_2$ radical.

Non-limiting examples of metallocenes suitable for use in the process according to the present invention are:

| | |
|---|---|
| $C_2H_4(Ind)_2MCl_2$ | $C_2H_4(Ind)_2MMe_2$ |
| $C_2H_4(Ind)_2M(NMe_2)_2$ | $C_2H_4(H_4Ind)_2MCl_2$ |
| $C_2H_4(H_4Ind)_2MMe_2$ | $C_2H_4(H_4Ind)_2M(NMe_2)OMe$ |
| $Me_2Si(Ind)_2MCl_2$ | $Me_2Si(Ind)_2MMe_2$ |
| $Ph(Me)Si(Ind)_2MCl_2$ | $Ph_2Si(Ind)_2MCl_2$ |
| $C_2Me_4(Ind)_2MCl_2$ | $Me_2SiCH_2(Ind)_2MCl_2$ |
| $C_2H_4(2\text{-MeInd})_2MCl_2$ | $C_2H_4(4,7\text{-Me}_2Ind)_2MCl_2$ |
| $C_2H_4(5,6\text{-Me}_2Ind)_2MCl_2$ | $C_2H_4(2,4,7\text{-Me}_3Ind)_2MCl_2$ |
| $C_2H_4(2\text{-MeH}_4Ind)_2MCl_2$ | $C_2H_4(4,7\text{-Me}_2H_4Ind)_2MCl_2$ |
| $C_2H_4(2,4,7\text{-Me}_3H_4Ind)_2MCl_2$ | $C_2H_4(Benz[e]Ind)_2MCl_2$ |
| $C_2H_4(2\text{-Me-Benz}[e]Ind)_2MCl_2$ | $Me_2Si(2\text{-MeInd})_2MCl_2$ |
| $Me_2Si(4,7\text{-Me}_2Ind)_2MCl_2$ | $Me_2Si(5,6\text{-Me}_2Ind)_2MCl_2$ |
| $Me_2Si(2,4,7\text{-Me}_3Ind)_2MCl_2$ | $Me_2Si(2\text{-MeH}_4Ind)_2MCl_2$ |
| $Me_2Si(4,7\text{-Me}_2H_4Ind)_2MCl_2$ | $Me_2Si(2,4,7\text{-Me}_3H_4Ind)_2MCl_2$ |
| $Me_2Si(Benz[e]Ind)_2MCl_2$ | $Me_2Si(2\text{-Me-Benz}[e]Ind)_2MCl_2$ | where Me=methyl, Cp=cyclopentadienyl, Ind=indenyl, Ph=phenyl, $H_4$Ind=4,5,6,7-tetrahydroindenyl and M is Ti, Zr or Hf, preferably Zr.

A particularly preferred metallocene compound for use in the process according to the present invention is ethylenebis (4,7-dimethyl-1-indenyl)zirconium dichloride.

The molar ratio between the aluminium of the alumoxane and the metal of the metallocene, compound is generally between about 5:1 and about 10000:1, and preferably between about 20:1 and about 5000:1.

Alumoxanes which can be used in the process according to the invention are, for example, those which are linear, branched or cyclic and contain at least one group of the type (IV):

(IV)

where the substituents $R^8$ which can be equal or different are $R^1$ or a group $—O—Al(R^8)_2$ and, if appropriate, some $R^8$ can be halogen atoms.

In particular, alumoxanes of the formula (V):

(V)

where n is 0 or an integer of between 1 and 40, in the case of linear compounds, or alumoxanes of the formula (VI):

(VI)

with n being an integer of between 2 and 40, in the case of cyclic compounds, can be used.

Those alumoxanes are particularly suitable for use according to the present invention in which the radicals $R^1$ are methyl groups, that is to say the methyl alumoxanes (MAO). These can be obtained by reacting trimethylaluminium (TMA) with water.

Non-limiting examples of compounds for the formation of an alkylmetallocene cation are compounds of the formula $Y^+Z^-$, where $Y^+$ is a Bronsted acid capable of donating a proton and irreversibly reacting with a substituent $X^1$ or $X^2$ of the compound pound of the formula (I), and $Z^-$ is a compatible anion which does not co-ordinate and which is capable of stabilizing the active catalytic species resulting from the reaction of the two compounds and which is sufficiently labile for being displaceable by an olefinic substrate. Preferably, the anion $Z^-$ consists of one or more boron atoms. More preferably, the anion $Z^-$ is an anion of the formula $BAr_4^{(-)}$, where the substituents Ar which can be identical or different are aryl radicals such as phenyl, pentafluorophenyl or bis(trifluoro-methyl)phenyl. Tetrakis-pentafluorophenyl borate is particularly preferred. Moreover, compounds of the formula $BAr_3$ can conveniently be used. Compounds of this type are described, for example, in the International Published Patent Application WP 92/00333, the content of which is to be incorporated in the present description by reference.

The catalysts which can be used in the process of the invention can furthermore contain one or more metalorganic compounds of aluminium of the formula $AlR^9_3$ or $Al_2R^9_6$, in which the substituents $R^9$ which can be equal or different are defined as the substituents $R^1$ or are hydrogen or halogen atoms.

Non-limiting examples of aluminium compounds of the formula $AlR^9_3$ or $Al_2R^9_6$ are:

$Al(Me)_3$, $Al(Et)_3$, $AlH(Et)_2$, $Al(iBu)_3$, $AlH(iBu)_2$, $Al(iEs)_3$, $Al(C_6H_5)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$ and $Al_2(Et)_3Cl_3$, where Me=methyl, Et=ethyl, iBu=isobutyl and iEs=isohexyl. Trimethyl aluminium (TMA) and triisobutylaluminium (TIBAL) are preferred.

The catalysts employed in the process of the present invention can advantageously be used on inert supports. These are obtained by depositing the metallocene compound or the product of the reaction thereof with the co-catalyst or the co-catalyst and subsequently the metallocene compound on inert supports such as, for example, silica, alumina, styrene/divinylbenzene copolymers or polyethylene.

A particularly suitable class of inert supports which can be used in the process of the present invention, are porous organic supports which are functionalized by groups with active hydrogen atoms. Those are particularly preferred in which the organic support is a partially crosslinked styrene polymer. These supports are described in the Italian Patent Application No. MI93A001467, whose content is to be incorporated in the present description by reference.

The solid compound thus obtained, in combination with the further addition of an alkylaluminium compound, either as such or prereacted with water, can also be used in gas-phase polymerization.

The ethylene polymerization process according to the present invention can be carried out not only in the gas-phase but also in the liquid phase, in the presence of an inert aromatic hydrocarbon solvent such as, for example, toluene, or preferably, in an aliphatic solvent such as, for example, propane or n-hexane.

The polymerization temperature is generally between 0° C. and 200° C., in particular between 20° C. and 100° C., and more particularly between 30° C. and 80° C.

The polymerization yields depend on the purity of the metallocene component of the catalyst. The metallocene compounds obtained by the process of the invention can therefore be used as such or be subjected to a purification treatment.

The components of the catalyst can be brought into contact with one another before the polymerization. The contact time is generally between 1 and 60 minutes, preferably between 5 and 20 minutes.

The examples which follow are given for illustrative purposes and do not restrict the invention.

Characterizations

The presence of functional groups on the supports is confirmed by IR analysis. The quantitative determination of the functional groups containing active hydrogen atoms is carried out by gas-volumetric measurement after reaction with triethylaluminium.

The porosity and the surface areas are determined by nitrogen adsorption by the BET method, using a SORP-TOMATIC 1900 instrument from Carlo Erba, and by mercury porosimetry using a Porosimeter 2000 from Carlo Erba.

The intrinsic viscosity (IV) is measured in tetralin at 135° C.

The melt index (MI) is measured under the following conditions:

condition E ($I_2$:ASTM D-1238) at 190° C. with a load of 2.16 kg;

condition F ($I_{21}$:ASTM D-1238) with a load of 21.6 kg; the melt flow ratio (MFR) is equal to the F/E ratio.

The content of comonomer units in the copolymers is determined by $^{13}$C-NMR analysis carried out by means of a Bruker 200 MHz instrument, using $C_2D_2Cl_4$ as solvent, at a temperature of 110° C.

The ratio of meso to racemic form for the metallocene compound was determined by $^1$H-NMR spectra carried out in $CDCl_3$ at 25° C. and taking as reference the signal of $CDCl_3$ at 7.25 ppm. The peak of the meso form is a 2.54 ppm and the peak of the racemic form is a 2.72 ppm. From the ratio of the areas deriving from the peaks it was obtained the ratio meso/racemic form.

The absolute density is determined by immersion of a sample of extruded copolymer in a column with a density gradient according to the ASTM D-1505 method.

The apparent bulk density (ABD) was determined by the method of DIN 53194.

The measurements by differential scanning calorimetry (DSC) were carried out on a DSC-7 instrument from the Perkin Elmer Co. Ltd. according to the following procedure. About 10 mg of sample are heated to 180° C. at a scanning rate equal to 10° C./minute; the sample is held for 5 minutes at 180° C. and then cooled at a scanning rate equal to 10° C./minute. A second scanning is then carried out according to the same procedure as the first. The values reported are those obtained in the second scanning.

The solubility in xylene at 25° C. was determined according to the following procedures. About 2.5 g of polymer and 250 ml of xylene are placed into a flask fitted with a cooler and reflux condenser and maintained under a blanket of nitrogen. It is heated at 135° C. with stirring for about 60 minutes. It is allowed to cool down to 25° C. with stirring. It is filtered and, after evaporation of the solvent from the filtrate to constant weight, the weight of the soluble material is obtained.

The TREF analyses were carried out using an apparatus equipped with two stainless steel columns having internal dimensions of 800×26 mm, which are connected to one another by a U-junction and packed with a bed consisting of small silanized glass spheres. The sample is dissolved in o-xylene (stabilized with 0.03% by weight of Irganox 1010 antioxidant) in a concentration of 7.5 mg/ml at a temperature of 140° C. The solution obtained is charged to the columns maintained at 125° C. and then cooled according to the following sequence: 125–90° C. in 30 minutes, 90–10° C. in 14 hours. After the cooling, a continuous elution with o-xylene is carried out at 10 ml/minute, the fractions being collected every 20 minutes. During the elution, the temperature of the column is slowly raised from 10° C. to 103° C. at a rate of 0.15° C./minute, and then from 103° C. to 125° C. at a rate of 2.2° C./minute.

Preparation of the Supports
Polystyrene Resin
An aqueous solution consisting of:
11 l of distilled water,
400 ml of a 5% by weight solution of ROAGIT SVM (Rohm) in water,
55.5 g of PROLIT C10 (Caffaro) and
11 g of sodium chloride
was introduced in an atmosphere of nitrogen into a glass reactor of 30 l capacity, fitted with a thermometer, reflux condenser, rod stirrer and thermocontrol system. This was stirred (350 r.p.m.) for 1 further hour at room temperature, and an organic solution consisting of 5.55 l of n-octane,
1.85 l of toluene,
1.55 l of styrene,
2.55 l of 64% divinylbenzene in ethylvinylbenzene and
74 g of 75% dibenzoyl peroxide in water was then introduced.

The temperature of the reactor was taken to 80° C. within 1 hour, maintained for 8 hours and then taken back to room temperature. The product obtained was subjected to repeated washings with distilled water, extraction with methanol at 50° C. and subsequently to drying at 100° C. under a residual pressure of 1 mm Hg. This gave 2.7 kg of product of microspheroidal morphology, having the following characteristics:
Surface area: 370 m$^2$/g (BET), 126 m$^2$/g (Hg),
Porosity: 1.74 ml/g (BET), 1.92 ml/g (Hg),
Mean pore radius: 94 Å (BET), 305 Å (Hg),
Particle size distribution (PSD):
0.8%>300 μm;
2.2% 300–250 μm;
7.0% 250–180 μm;
10.5% 180–150 μm;
73.2% 150–106 μm;
5.5% 106–75 μm;
0.8%<75 μm.
Preparation of the Functionalized Support (A1)
(a) Acylation
300 ml of carbon disulphide and 30 g of the polystyrene resin were introduced under a nitrogen atmosphere into a glass reactor of 750 ml capacity fitted with a thermometer, reflux condenser, rod stirrer and a thermocontrol system. After setting a constant temperature of 12° C., 66 g (0.49 mol) of previously ground AlCl$_3$ and then, within 1 hour, 32 ml of freshly distilled CH$_3$COCl were added. The temperature was then taken to 25° C. and maintained for 6 hours under stirring. The mixture was then transferred with constant stirring into a 3 l flask containing a mixture of about 1 kg of ground ice and 300 ml of HCl (37%), and stirred for a further 30 minutes. The resin recovered after filtration was subjected to repeated washings with distilled water and then with acetone and finally with methanol. After drying, this gave 34 g of product of spheroidal morphology. The I.R. spectrum showed a band centered at 1685 cm$^{-1}$ attributable to carbonyl.

(b) Reduction 15.2 g of the acetylated resin obtained under (a), 100 ml of dioxane, 100 ml of distilled water and 15 g of NaBH$_4$ were introduced into a glass reactor of 500 ml capacity fitted with a thermometer, reflux condenser and rod stirrer. The mixture was continuously stirred for 50 hours at a temperature of 25° C., and a further 4 g of NaBH$_4$ were then added, stirring being continued for another 70 hours. The resin recovered after filtration was subjected to repeated washings with distilled water, then with acetone and finally with methanol. After drying, 13.4 g of a product of spheroidal morphology were recovered. The IR spectrum showed a broadened band centered on 3440 cm$^{-1}$, attributable to hydroxyl while the carbonyl band at 1685 cm$^{-1}$ was much reduced compared with that of the resin obtained under (a). The hydroxyl group content, determined by gas-volumetric titration with triethylaluminium, was found to be 3.3 meq per gram of resin.

Preparation of the Functionalized Support (A2)
(a) Acylation 4300 ml of methylene chloride and 225 g of the polystyrene resin were introduced into a reactor of 6 liters capacity, fitted with a mechanical stirrer and a thermostat system. The mixture was cooled to 10° C., and 580 g of (previously ground) AlCl$_3$ were rapidly added. While maintaining the internal temperature at 10° C., 230 ml of acetyl chloride were added dropwise within 1 hour. The reaction mixture was continuously stirred at 25° C. for a further 24 hours. The reaction mixture was carefully poured into a suspension consisting of 2160 ml of distilled H$_2$O, 2160 g of ice and 2160 ml of 37% HCl solution. After the end of the addition, stirring was continued for another 30 minutes and the solid residue was then filtered off and washed repeatedly with distilled H$_2$O and then with acetone and subsequently methanol. The product obtained was dried at 60° C.; 260 g of product were recovered. The IR spectrum showed a band centered on 1680 cm$^{-1}$, belonging to the carbonyl group.

(b) Reduction 1060 ml of methanol and 260 g of the acylated resin obtained under (a) were introduced into a 3-liter flask fitted with a mechanical stirrer, thermometer and a thermostat system. While maintaining the temperature of the suspension at below 35° C., a solution consisting of 138 g of NaBH$_4$, 170 ml of NaOH (20%) and 1060 ml of distilled water was fed in the course of 2 hours. The mixture was allowed to react for 48 hours at 25° C. and then 200 ml of acetone were slowly added in order to destroy the excess NaBH$_4$. The resin was filtered off and then repeatedly washed with, in this order distilled water, acetone, methanol and acetone. The product was dried in vacuo at 60° C. for 24 hours. 234 g of product were recovered. The IR analysis showed a broadened band centered on 3440 cm$^{-1}$, while the carbonyl band at 1680 had disappeared. The hydroxy group content was determined by gas-volumetric titration with triethyl-A, giving 1.9 meq per gram of resin. The particles of spherical shape show a mean dimension of 150 μm with the following characteristics of surface area and porosity: 327 m$^2$/g and 0.7 ml/g with a mean pore diameter of 43 Å (Sorptomatic 1900 BET porosimeter) and 144 m$^2$/g and 1.53 ml/g with pores of 212 Å (Hg).

Preparation of the Catalytic Components
rac/meso-ETHYLENE-BIS(4,7-DIMETHYL-INDENYL) ZIRCONIUM DICHLORIDE
(a) Preparation of 4,7-dimethylindene The synthesis was carried out according to the method described in "Organometallics, 1990, 9, 3098" (54% yield on p-xylene).

(b) Preparation of 1,2-bis(4,7-dimethyl-3-indenyl)ethane 38.2 g (265 mmol) of 4,7-dimethylindene were dissolved in 350 ml of tetrahydrofuran, and the temperature of the solution was taken to 0° C. 165 ml of n-butyllithium (1.6 M in hexane, 264 mmol) were then added dropwise drop over 2.5 hours. After returning to room temperature and continued stirring for 4 hours, a red-purple solution of 4,7-dimethylindenyllithium was obtained. This solution was cooled to −70° C. and treated dropwise in the course of 35 minutes with 25.3 g of 1,2-dibromoethane (135 mmol) in 15 ml of tetrahydrofuran. After returning to room temperature, this gave a clear yellow solution, to which water was added. The organic phase was collected and dried over $Na_2SO_4$. The solvent was then evaporated in vacuum, 20 g of product (48% yield) being obtained.

(c) Preparation of rac/meso-ethylene-bis(4,7-dimethyl-1-indenyl)zirconium dichloride (B1)

A suspension of 10 g of 1,2-bis(4,7-dimethylindenyl) ethane (31.8 mmol) in 80 ml of tetrahydrofuran was added by means of a cannula to a solution of 2.82 g of KH (70.3 mmol) in 160 ml of tetrahydrofuran under constant stirring. After cessation of the evolution of hydrogen, the resulting brown solution was separated from the excess KH. This solution and a solution of 12 g of $ZrCl_4$ $(THF)_2$ (31.8 mmol) in 250 ml of tetrahydrofuran were added dropwise in the course of 3 hours by means of a cannula to a flask containing 50 ml of rapidly stirred tetrahydrofuran. A yellow solution and a precipitate were formed. After removal of the solvent in vacuum, the yellow-orange residue (mixture of the racemic and meso isomers in a ratio of 2.33:1 according to $^1$H-NMR analysis) was subjected to extraction with $CH_2Cl_2$ until all the orange product was completely dissolved. The yellow solid (1.7 g) proved to be a single stereoisomer, namely the meso (11.3% yield). After evaporation of the $CH_2Cl_2$ from the orange solution, 4.9 g of a yellow-orange solid corresponding to a mixture of 93.7% of the racemic isomer and 6.3% of the meso isomer, as determined by $^1$H-NMR analysis, were obtained.

(d) Preparation of rac/meso-ethylene-bis(4,7-dimethyl-1-indenyl)zirconium dichloride (B2)

The procedure as under (c) was followed, but the extraction with $CH_2Cl_2$ was continued until 5.1 g of yellow-orange solid corresponding to a mixture of 90.6% of the racemic isomer and 9.4% of the meso isomer, as determined by $^{1H}$-NMR analysis, were obtained.

(e) Preparation of rac-ethylene-bis(4,7-dimethyl-1-indenyl) zirconium dichloride (B3)

1.0 g of the solid product obtained under (c) was subjected to recrystallization from toluene at −20° C. 0.3 g of crystals of orange colour were separated off, which were found to be composed of pure rac-ethylene-bis(4,7-dimethyl-1-indenyl) zirconium dichloride, as determined by $^1$H-NMR analysis.

ETHYLENE-BIS(INDENYL)HAFNIUM/ZIRCONIUM DICHLORIDE
(a) Preparation of 1,2-bisindenylethane The preparation described by J. Ewen in J. Am. Chem. Soc., 1987, 109, 6544, Suppl. mat., was followed.

50.8 g of indene (437 mmol) were dissolved under an inert atmosphere in 500 ml of tetrahydrofuran in a 2-necked 2 l flask and cooled to −78° C. 175 ml of n-butyllithium (2.5 M in hexane, 437.5 mmol) were added dropwise slowly (1 hour). The mixture was allowed to warm again to room temperature and was stirred for a further 4 hours. It was cooled to −78° C., and 40.42 g of 1,2-dibromoethane (215 mmol) dissolved in 100 ml of tetrahydrofuran were added dropwise (within 20 minutes). After the end of the addition, the temperature was taken to 50° C., stirring was continued for 12 hours, and the mixture was then allowed to cool to room temperature, and 20 ml of water were added. The organic phase was dried and the residue was extracted with pentane. Evaporation in vacuum gave 28.65 g of product (yield=51.6%).

(b) Preparation of ethylene-bis(indenyl)hafnium dichloride/ ethylene-bis(indenyl)zirconium dichloride 7.13 g (27.8 mmol) of 1,2-bisindenylethane and 50 ml of anhydrous tetrahydrofuran were placed into a two-necked 250 ml flask. The yellow solution was cooled to −78° C. and 34.5 ml of n-butyllithium (1.6 M in hexane, 55.2 mmol) were added. This gave a reddish-brown solution which was heated under reflux for one minute and then allowed to cool to room temperature.

8.84 g of anhydrous $HfCl_4$ (Strem product, 2.7% of Zr) (27.6 mmol) were placed into a four-necked flask fitted with a cooler and dissolved at a temperature of −180° C. in 70 ml of tetrahydrofuran. The solution was then heated under reflux for 30 minutes, giving a brown-violet suspension which was allowed to cool to ambient temperature with vigorous stirring.

The solution of the lithium salt of bisindenylethane was then added in about 2 minutes and stirring was continued for 2 hours and 30 minutes. The solution obtained became brown-yellow in colour. Bubbling in gaseous HCl gave a yellow-orange suspension. The solvent was removed in vacuo, 100 ml of ethyl ether were added and the mixture was left overnight at 0° C. The residue filtered off from the ethereal solution, was dried in vacuum and extracted with 3 times 100 ml of methylene chloride.

The solution was concentrated to 30 ml, causing yellow microcrystals to precipitate which were filtered off.

This gave 1.15 g of product which $^1$H-NMR analysis showed to consist of 96% of ethylene-bis(indenyl)hafnium dichloride and 4% of ethylene-bis(indenyl)zirconium dichloride.

METHYLALUMOXANE (MAO)

A commercial product (Schering, now Witco, MW 1400) was used in a 30% by weight solution in toluene. After removal of the volatile fractions in vacuo, the semicrystalline material was crushed until a white powder was obtained which was further treated in vacuo (0.1 mmHg) for 4 hours at a temperature of 40° C.

TRIISOBUTYLALUMINIUM (TIBAL)

A commercial product (Schering, now Witco) was used in a 20% weight-volume solution in hexane.

Polymerizations

All the operations to prepare catalysts were carried out in an atmosphere of anhydrous nitrogen.

EXAMPLE 1

(a) Preparation of the Supported Catalyst 100 ml of anhydrous toluene and 5.2 g of the support (Al) were introduced into a glass reactor of 350 ml capacity, fitted with a thermometer, reflux condenser, rod stirrer and a thermocontrol system. 30 ml of a 1 M toluene solution of MAO (157 mg of Al/g of support) was added within 40 minutes to the mixture at a constant temperature of −5° C. with continued stirring. The reaction was allowed to proceed for 1 hour at a temperature of −5° C., then for 1 hour at a temperature of 0° C., for 1 hour at 30° C. and then for 4 hours at a temperature of 80° C. After cooling to 25° C., the solid residue was filtered off and washed with 100 ml of toluene and redispersed in 100 ml of toluene. It was then cooled to 0° C., and 50 ml of a toluene solution containing 224.2 mg of the mixture of rac/meso-ethylene-bis(4,7-dimethyl-indenyl)zirconium dichloride (B1) (8.3 mg of Zr/g of support) were added in 55 minutes. The temperature was taken to 30° C., and the mixture was stirred for a further 2 hours. This gave a suspension of reddish colour which was allowed to settle, giving a precipitate and a colourless solution which was removed by syphoning. The precipitate was repeatedly washed with anhydrous toluene and then dried in vacuum. 7.0 g of a product of microspheroidal morphology were recovered, having the following composition by weight: 9.6% of Al, 0.7% of Cl, 0.44% of Zr.

(b) Polymerization

A steel autoclave of 2.5 l capacity, fitted with a rod stirrer with magnetic drive, a manometer, a temperature indicator, a catalyst feed system, monomer feed lines and a thermostat jacket was cleaned by washing with propane at 70° C. At ambient temperature, 5 mmol of TIBAL in 5 ml of hexane, 1260 ml of propane and the quantities of ethylene, 1-butene and hydrogen indicated in Table 1 were introduced, and the reactor was heated to 45° C.

The catalyst suspension was prepared in a Schlenck-type test tube with a drain cock at the bottom. 5 mmol of TIBAL in 5 ml of hexane and then 92 mg of the supported catalyst obtained under (a) were successively introduced at a temperature of 25° C.

The reagents were left in contact for 5 minutes, and the suspension was then introduced into the autoclave by excess ethylene pressure.

The temperature was then taken to 50° C. and maintained constant for the duration of the polymerization. The total pressure was kept constant by feeding an ethylene/1-butene mixture in a molar ratio equal to 18. The polymerization was stopped by introducing 0.6 l(STP) of CO into the autoclave after cooling to 30° C.

The reactor was allowed to degas slowly, and the polymer obtained was dried at 60° C. in vacuum.

The polymerization conditions are indicated in Table 1, while the data relating to the polymer are indicated in Table 2.

EXAMPLE 2

(a) Preparation of the Supported Catalyst 300 ml of toluene and 30.2 g of the support (A2) were introduced into a jacketed reactor of 750 ml capacity, fitted with a rod stirrer, thermometer, reflux condenser and thermocontrol system.

The suspension was thermostatically controlled at −10° C., and 200 ml of a solution of 0.9 M of MAO (160 mg of Al/g of support) were added in 70 minutes. The mixture was kept for 60 minutes at −10° C., for 60 minutes at 0° C., for 60 minutes at 30° C. and for 240 minutes at 80° C. The suspension was filtered at 50° C. and subjected to 2 washings with 200 ml of anhydrous toluene and finally dried in vacuum. 66.8 g of spheroidal particles containing 7.5% by weight of Al and 27.0% by weight of solvent were recovered.

100 ml of anhydrous toluene and 4.9 g of the spheroidal particles obtained were introduced into a jacketed reactor of 350 ml capacity fitted with a rod stirrer, thermometer, reflux condenser and a thermocontrol system.

The suspension was cooled to 0° C., and 30 ml of a toluene solution containing 0.1 g of the mixture of rac/meso-ethylene-bis(4,7-dimethyl-indenyl)zirconium dichloride (B1) (6.1 mg of Zr/g of support) were added in 30 minutes.

The suspension of red-orange colour was stirred for a further 3 hours at 30° C. After decanting from the solid, the liquid was filtered and the residue was subjected to 2 washings with 100 ml of toluene and 2 washings with 100 ml of hexane and was finally dried in vacuum at 25° C. 3.6 g of product of microspheroidal morphology, having the following composition by weight: 8.7% of Al, 0.98% of Cl, 0.36% of Zr, were recovered.

(b) Polymerization

The procedure described under (b) in Example 1 was followed, using 105 mg of the supported catalyst obtained under (a).

The polymerization conditions are indicated in Table 1, while the data relating to the polymer are indicated in Table 2.

EXAMPLE 3

(a) Preparation of the Supported Catalyst

The procedure described under (a) in Example 2 was followed, but using 9.6 mg of Zr/g of support. 3.3 g of product of microspheroidal morphology, having the following composition by weight: 8.6% of Al, 1.05% of Cl, 0.44% of Zr, were recovered.

(b) Polymerization

The procedure described under (b) in Example 1 was followed, using 106 mg of the supported catalyst obtained under (c).

Figure 1:
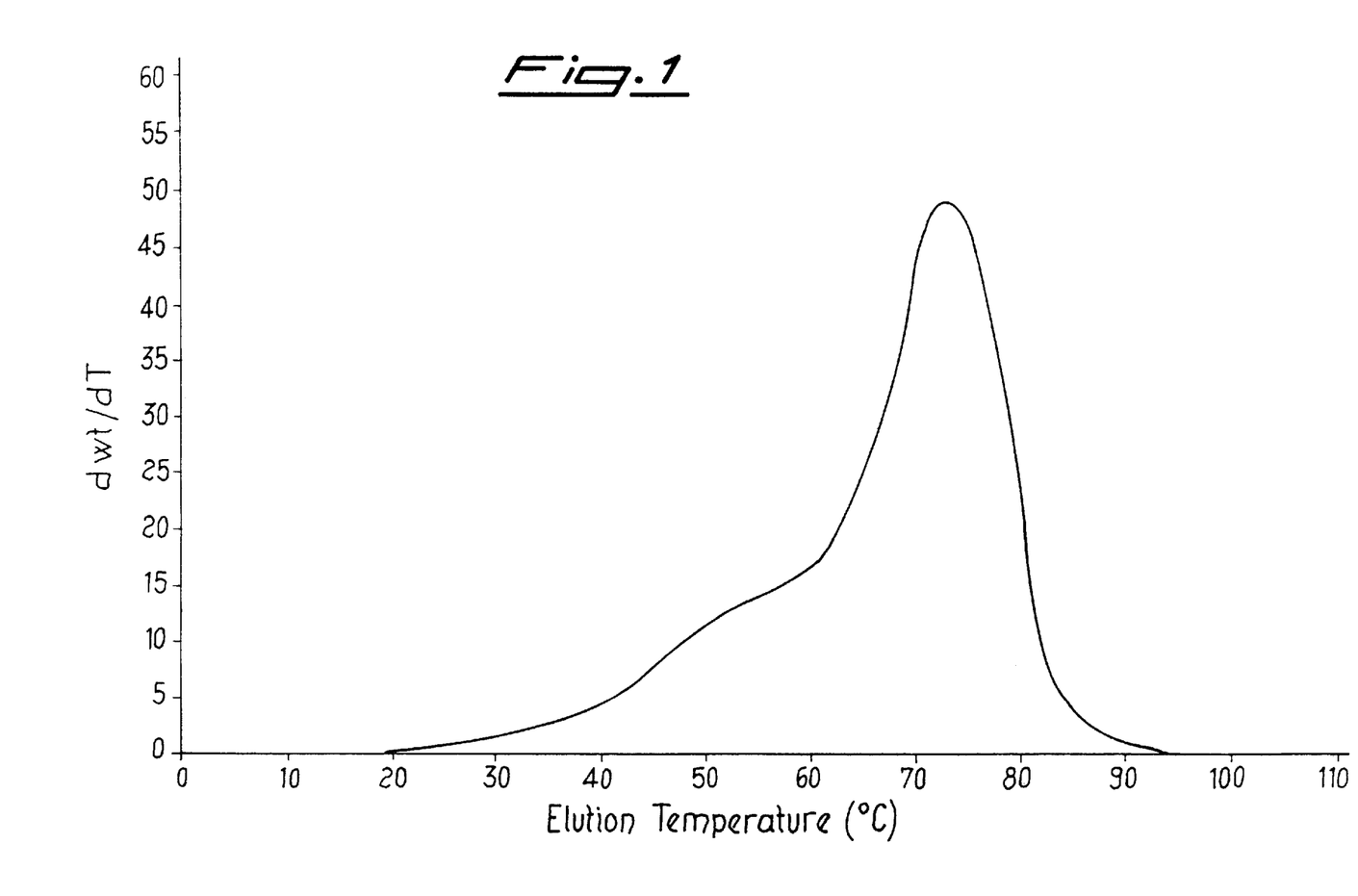
FIG. 1 shows the result of the TREF analysis of an ethylene/1-butene copolymer according to the invention.

The polymerization conditions are indicated in Table 1, while the data relating to the polymer are indicated in Table 2. The result of the TREF analysis is indicated in FIG. 1.

EXAMPLE 4

(a) Preparation of the Supported Catalyst

The procedure described under (a) in Example 2 was followed, but using the mixture of rac/meso-ethylene-bis(4,7-dimethyl-indenyl)zirconium dichloride (B2) (7.8 mg of Zr/g of support) in place of the mixture (B1). 5.4 g of product of a microspheroidal morphology, having the following composition by weight: 8.1% of Al, 1.09% of Cl, 0.44% of Zr, were recovered.

(b) Polymerization

The procedure described under (b) in Example 1 was followed, using 267 mg of the supported catalyst obtained under (a).

The polymerization conditions are indicated in Table 1, while the data relative to the polymer are indicated in Table 2.

EXAMPLE 5

The procedure described under (b) in Example 1 was followed, but in the absence of TIBAL and using MAO (4.2 mmol of Al) and 0.5 mg of the mixture (Bi) for preparing the catalyst.

The polymerization conditions are indicated in Table 1, while the data relative to the polymer are indicated in Table 2.

EXAMPLE 6

The procedure of the preceding example was followed, but using 0.1 mmol of MAO and adding 5 mmol of TIBAL to the autoclave.

The polymerization conditions are indicated in Table 1, while the data relating to the polymer are indicated in Table 2.

EXAMPLES 7–8

(For Comparison)

The procedure followed was as in Example 5, but in the absence of MAO and using 2.1 mmol of TIBAL and 1.0 mg of the metallocene (B3). 1.05 mmol of $H_2O$ were then added to the autoclave.

The polymerization conditions are indicated in Table 1, while the data relating to the polymer are indicated in Table 2.

EXAMPLE 9

(For Comparison)

The procedure followed was as in Example 5, but using 4.7 mmol of MAO and, in place of the mixture (B1), 1.0 mg of a mixture consisting of 96% of ethylene-bis(indenyl) hafnium dichloride and of 4% of ethylene-bis(indenyl) zirconium dichloride.

Figure 2:
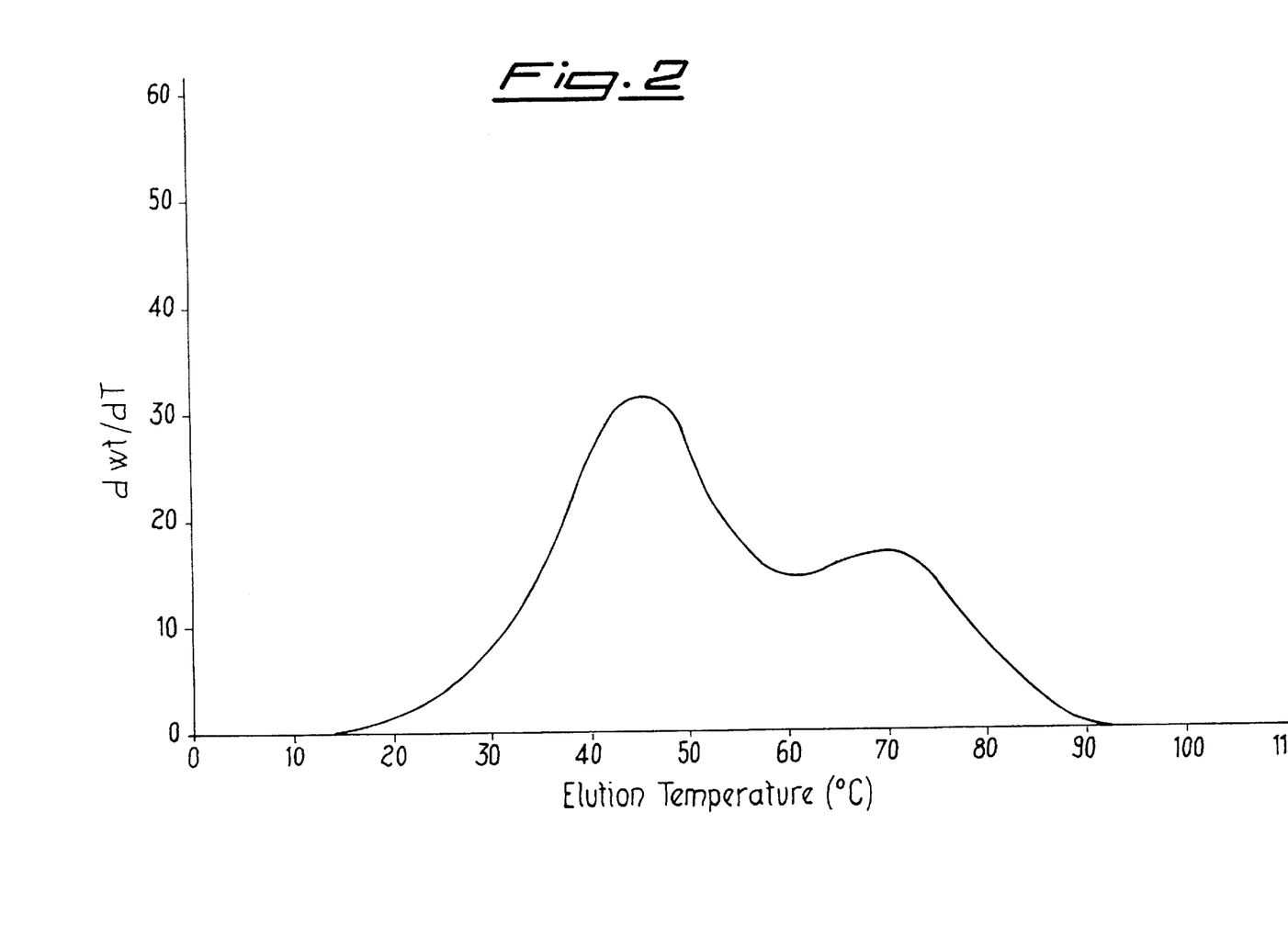
FIG. 2 shows the result of the TREF analysis of an ethylene/1-butene copolymer prepared by the method described by K. Heiland and W. Kaminsky in the article cited above.

The polymerization conditions are indicated in Table 1, while the data relating to the polymer are related in Table 2. The result of the TREF analysis is indicated in FIG. 2.

EXAMPLE 10

The procedure described under (b) in Example 1 was followed, but carrying out the polymerization reaction at a temperature of 70° C., using 0.95 l of anhydrous hexane in place of propane, and 42 mg of the supported catalyst obtained under (a) in Example 3.

The polymerization conditions are indicated in Table 1, while the data relating to the polymer are indicated in Table 2.

EXAMPLE 11

The procedure of the preceding example was followed, but carrying out the polymerization reaction at a temperature of 80° C. and using 16.4 mg of supported catalyst.

The polymerization conditions are indicated in Table 1, while the data relating to the polymer are indicated in Table 2.

EXAMPLE 12

(a) Preparation of the Supported Catalyst

The procedure described under (a) in Example 2 was followed, but using the mixture of rac/meso-ethylene-bis(4, 7-dimethyl-indenyl)zirconium dichloride (B2) (7.8 mg of Zr/g of support) in place of the mixture (B1). 5.4 g of product of microspheroidal morphology, having the following composition by weight: 8.1% of Al, 1.09% of Cl, 0.44% of Zr, were recovered.

(b) Polymerization

A steel autoclave of 2.5 liters capacity, fitted with a rod stirrer with magnetic drive, manometer, temperature indicator, catalyst feed system, a monomer feedline and a thermostat jacket, was cleaned by washing with propane at 70° C.

At ambient temperature, 280 ml of anhydrous 1-hexene (distilled over $LiAlH_4$), 5 mmol of TIBAL in 5 ml of hexane, 640 ml of propane and the monomer quantities indicated in Table 1 were introduced, and the reactor was then heated to 55° C.

The catalyst suspension was prepared separately by adding, in a vial with bottom discharge, 5 mmol of TIBAL in 5 ml of hexane and 190 mg of the supported catalyst obtained under (a) at a temperature of 25° C.

The components were left in contact for 5 minutes at ambient temperature, before they were introduced into the autoclave by excess ethylene pressure.

The temperature was raised to 60° C. and kept constant during the polymerization run. The total pressure was maintained constant during the run by continuously feeding ethylene.

The polymerization was stopped by introducing 0.6 l(STP) of CO into the autoclave, followed by rapid cooling to 30° C. The reactor was allowed to degas slowly, and the polymer obtained was dried at 60° C. in vacuum.

Figure 3:
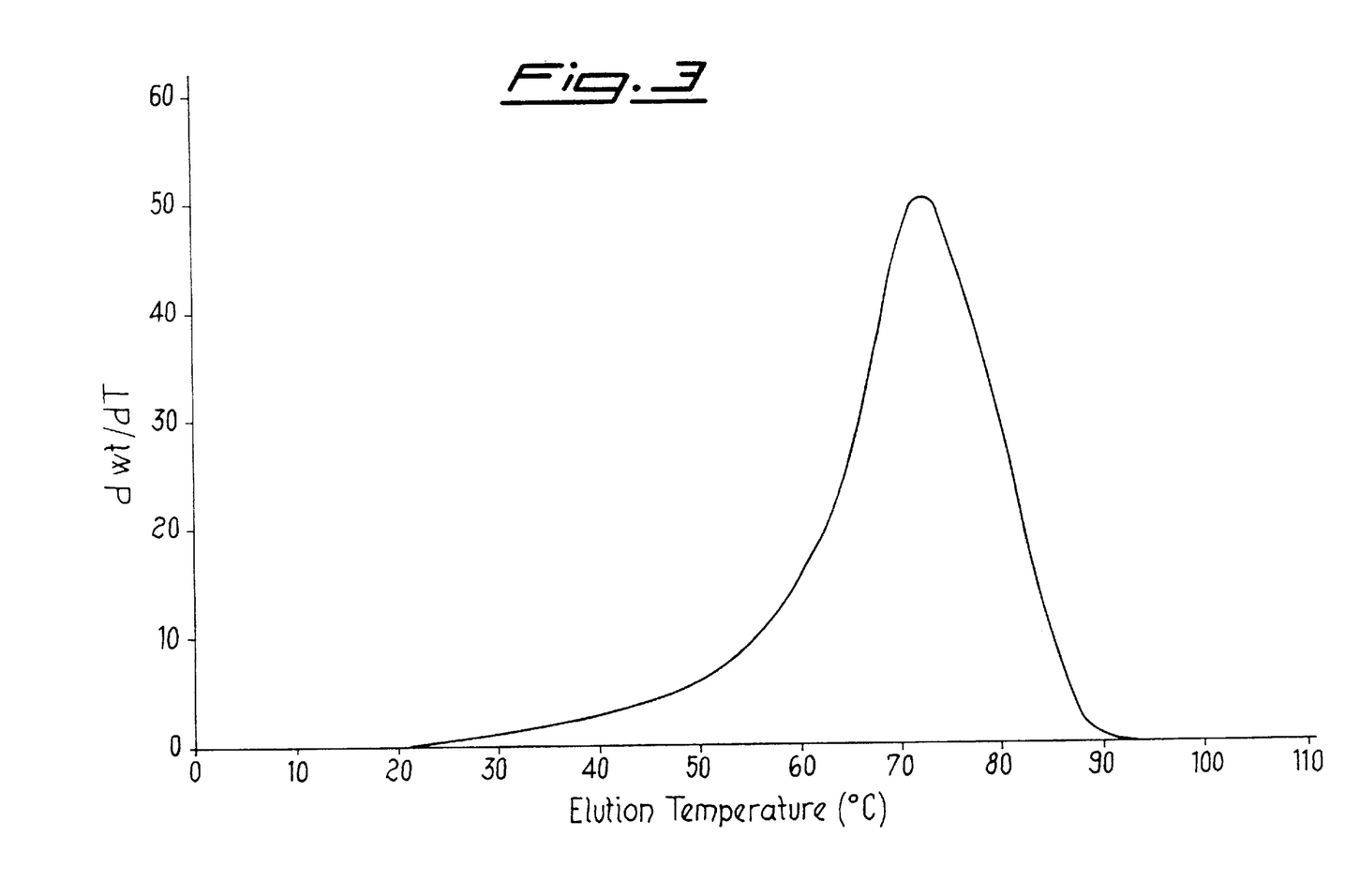
FIG. 3 shows the result of the TREF analysis of an ethylene/1-hexene copolymer according to the invention.

The polymerization conditions are indicated in Table 1, while the data relating to the polymer are indicated in Table 2. The result of the TREF analysis is indicated in FIG. 3.

EXAMPLE 13

(a) Preparation of the Supported Catalyst

The procedure followed was as described under (a) in Example 12, but using 12.2 mg Zr/g of support.

5.6 g of product of microspheroidal morphology, having the following composition by weight: 9.3% of Al, 1.03% of Cl, 0.51% of Zr, were recovered.

(b) Polymerization

The procedure described under (b) in Example 12 was followed, but using 132 mg of the supported catalyst obtained under (a).

The polymerization conditions are indicated in Table 1, while the data relating to the polymer are indicated in Table 2.

EXAMPLE 14

A steel autoclave of 2.5 l capacity, fitted with a rod stirrer with magnetic drive, manometer, temperature indicator, catalyst feed system, monomer feedlines and a thermostat jacket, was cleaned by washing with ethylene at 70° C.

5 mmol of TIBAL in 1070 ml of hexane were introduced at ambient temperature into the autoclave and, after heating to 70° C. and pressurizing with 16.8 bar of ethylene, 1.73 bar of hydrogen were introduced. The autoclave was then cooled to 65° C.

The catalyst suspension was prepared in a Schlenck-type test tube with a discharge cock at the bottom. At a temperature of 25° C., 5 mmol of TIBAL in 5 ml of hexane and then 500 mg of the supported catalyst obtained under (a) in Example 13 were added in sequence. The components were left in contact for 5 minutes, and the suspension was then introduced into the autoclave by excess ethylene pressure.

The temperature was raised to 70° C. and the total pressure was kept constant by continuously feeding ethylene. After 100 minutes, the polymerization was stopped by cooling to 30° C. and introducing 0.6 l(STP) of CO.

The polymer suspension was filtered and the polymer obtained was dried in an oven at 60° C. in vacuum. This gave 440 g of spheroidal granules having the following characteristics:

$MIE(I_2)$=0.34
MFR=84
absolute density=0.9623 g/ml
ABD=0.35 g/ml
Tm=134° C.

TABLE 1

| EXAMPLE | 1-butene (ml) | ethylene (bar) | $H_2$ (bar) | time (min) | yield (g) | activity (kg/g of Zr/h) |
|---|---|---|---|---|---|---|
| 1 | 285 | 16.5 | 0.05 | 154 | 136 | 131.0 |
| 2 | 165 | 15.9 | 0.11 | 120 | 132 | 125.7 |
| 3 | 164 | 15.9 | 0.11 | 120 | 252 | 237.7 |
| 4 | 170 | 16.4 | 0.55 | 166 | 604 | 186.0 |
| 5 | 363 | 16.7 | 0.3 | 120 | 130 | 676.2 |
| 6 | 164 | 16.0 | 0.1 | 120 | 46 | 239.3 |
| 7 COMP. | 370 | 16.8 | 0.38 | 120 | 350 | 910.3 |
| 8 COMP. | 500 | 10.6 | 0.31 | 120 | 127 | 330.3 |
| 9 COMP. | 117 | 17.6 | 0.2 | 120 | 63 | 90.7 |
| 10 | 204 | 31.1 | 0.13 | 120 | 200 | 538.5 |
| 11 | 210 | 33.5 | 0.11 | 120 | 68 | 471.1 |
| 12 | 280* | 14.5 | 0.37 | 120 | 629 | 371.5 |
| 13 | 280* | 14.6 | 0.56 | 240 | 335 | 86.3 |

*1-hexene

TABLE 2

| EXAMPLE | [η] (dl/g) | Melt index | | | 1-Butene (% by weight) | Density (g/ml) | DSC | | | TREF | |
| | | $I_2$ (g/10 min) | $I_{21}$ (g/10 min) | MFR | | | Tm (II) (° C.) | $\Delta H_f$ (J/g) | $M_w/M_n$ | (Δ ° C./90% polymer) | XSRT (% by weight) |
|---|---|---|---|---|---|---|---|---|---|---|---|
| 1 | 1.9 | n.d. | 3.37 | — | 11.5 | 0.9062 | 98 | 71 | 5.8 | 40 | 1.8 |
| 2 | 1.53 | 0.1 | 18.8 | 145 | 9.0 | 0.9158 | 105 | 105 | 8.1 | n.d. | 1.6 |
| 3 | 1.49 | 0.2 | 30.1 | 188 | 9.8 | 0.9145 | 102 | 106 | 6.4 | 35 | 4.4 |
| 4 | 1.40 | 0.4 | 60.8 | 169 | 9.0 | 0.9177 | 107 | 80 | 6.9 | n.d. | 3.4 |
| 5 | 2.11 | 0.4 | 32.1 | 73 | 10.7 | 0.9140 | 96 | 94 | 4.2 | 45 | 5.4 |
| 6 | 2.01 | 0.77 | 44.3 | 58 | 8.2 | 0.9210 | 110 | 111 | 4.9 | 40 | 1.4 |
| 7 COMP. | 1.46 | 0.4 | 16.8 | 40 | 9.2 | 0.9112 | 104 | 87 | 2.9 | 30 | 1.1 |
| 8 COMP. | 1.25 | 4.0 | 83.5 | 21 | 11.5 | 0.9055 | 100 | 74 | 2.3 | 40 | 3.8 |
| 9 COMP. | 1.40 | 2.82 | 113.9 | 40 | 13.1 | 0.9125 | 84/109 | 69 | 7.9 | 60 | 15.9 |
| 10 | 1.5 | 0.34 | 20.4 | 60 | 6.1 | 0.9225 | 115 | 127 | 3.7 | n.d. | 1.0 |
| 11 | 1.5 | 0.8 | 58.8 | 73 | 5.4 | 0.9276 | 118 | 138 | 4.3 | n.d. | 0.6 |
| 12 | 1.44 | 0.19 | 24.4 | 128 | 11.5* | 0.9165 | 107 | 88 | 5.4 | 30 | 2.2 |
| 13 | 1.24 | 1.07 | 86.6 | 81 | 11.0 | 0.9195 | 108 | 115 | 6.9 | n.d. | n.d. | n.d. = not determined
*1-hexene

What is claimed is:

1. A process for the preparation of ethylene polymers having the following characteristics:

(a) $M_w/M_n > 4$, where $M_w$ is the weight average molecular weight and $M_n$ is the number-average molecular weight, both determined by GPC; and (b) no more than one melting point is detectable by differential scanning calorimetry analysis;

said process comprising the polymerization reaction of ethylene in the presence of a catalyst consisting of the reaction product of:

(A) a mixture of racemic and meso isomers of a stereorigid metallocene compound of a transition metal belonging to Groups III, IV or V or the lanthanides in the Periodic Table of the Elements, with two cyclopentadienyl ligands connected to each other by a chemical bridge, and (B) at least one co-catalyst capable of activating both the racemic form and the meso form of the metallocene compound, selected from the alumoxanes and the compounds capable of forming an alkylmetallocene cation.

2. The process according to claim 1, wherein the polymerization reaction of the ethylene is carried out in the presence of a comonomer selected from α-olefins of the formula $CH_2=CH—CH_2R$, where R is a linear, branched or cyclic alkyl radical selected from the group consisting of carbon atoms having 1–20 carbons alkylradicals, cycloolefins, and polyenes.

3. The process according to claim 1, wherein the racemic form and the meso form of the metallocene compound are present in a weight ratio of between 99:1 and 1:99 respectively.

4. The process according to claim 1, wherein the metallocene compound is represented by the formula (I):

in which M is a metal selected from Ti, Zr and Hf, the substituent $R^1$ is selected from the group consisting of $C_1$–$C_{20}$-alkyl radicals, $C_3$–$C_{20}$-cyclo-alkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and contain Si or Ge atoms;

the substituents $R^2$ and $R^3$ are selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and contain Si or Ge atoms;
    if the substituents $R^2$ are other than hydrogen, the substituents $R^1$ and $R^2$ on the same cyclopentadienyl can form a ring containing 5 to 20 carbon atoms;

$R^4$ is a divalent group selected from the group consisting of $(CR^5_2)_n$, $(SiR^5_2)_n$, $(GeR^5_2)_n$, $NR^5$ and $PR^5$, where the substituents $R^5$ which can be identical or different are selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and, if $R^4$ is $(CR^5_2)_n$, $(SiR^5_2)_n$, or $(GeR^5_2)_n$, two substituents $R^5$ on the same carbon, silicon or germanium atom can form a ring containing 3 to 8 atoms, wherein n is an integer between 1 and 4;

the substituents $X^1$ and $X^2$ are hydrogen or halogen atoms, $R^6$, $OR^6$, $SR^6$, $NR^6_2$ or $PR^6_2$, where the substituents $R^6$ which can be identical or different are selected from the group consisting of $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and contain Si or Ge atoms.

5. The process according to claim 4, wherein the metallocene compound is represented by the formula (II):

(II)

where M is a metal selected from the group consisting of Ti, Zr and Hf, $R^3$ is selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_3$–$C_{20}$-cycloalkyl radicals, $C_2$–$C_{20}$-alkenyl radicals, $C_5$–$C_{20}$-cycloalkyl radicals, $C_7$–$C_{20}$-alkylaryl radicals, $C_7$–$C_{20}$-arylalkyl radicals and contain Si or Ge atoms; $R^4$ is a divalent group selected from the group consisting of $(CR^5_2)_n$, $(SiR^5_2)_n$, $(GeR^5_2)_n$, $NR^5$ and $PR^5$, where the substituents $R^5$ which can be identical or different are selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and, if $R^4$ is $(CR^5_2)_n$, $(SiR^5_2)_n$, or $(GeR^5_2)_n$, two substituents $R^5$ on the same carbon, silicon or germanium atom can form a ring containing 3 to 8 atoms, wherein n is an integer between 1 and 4;

the substituents $X^1$ and $X^2$ are hydrogen or halogen atoms, $R^6$, $OR^6$, $SR^6$, $NR^6_2$ or $PR^6_2$, where the substituents $R^6$ which can be identical or different are selected from the group consisting of $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and contain Si or Ge atoms; and the substituents $R^7$ are selected from the group consisting of hydrogen, $C_1$–$C_{10}$-alkyl radicals, $C_3$–$C_{10}$-cycloalkyl radicals, $C_2$–$C_{10}$-alkenyl radicals, $C_6$–$C_{10}$-aryl radicals, $C_7$–$C_{10}$-alkylaryl radicals and $C_7$–$C_{10}$-arylalkyl radicals and can contain Si or Ge atoms and, wherein two adjacent substituents $R^7$ form a ring having 5 to 8 carbon atoms.

6. The process according to claim 5, wherein the metallocene compound is ethylene-bis(4,7-dimethyl-1-indenyl) zirconium dichloride.

7. The process according to claim 5, wherein the metallocene compound is represented by the formula (III):

(III)

where M is a metal selected from the group consisting of Ti, Zr and Hf, $R^3$ is selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_3$–$C_{20}$-cycloalkyl radicals, $C_2$–$C_{20}$-alkenyl radicals, $C_5$–$C_{20}$-cycloalkyl radicals, $C_7$–$C_{20}$-alkylaryl radicals, $C_7$–$C_{20}$-arylalkyl radicals and contain Si or Ge atoms; $R^4$ is a divalent group selected from the group consisting of $(CR^5_2)_n$, $(SiR^5_2)_n$, $(GeR^5_2)_n$, $NR^5$ and $PR^5$, where the substituents $R^5$ which can be identical or different are selected from the group consisting of hydrogen atoms, $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and, if $R_4$ is $(CR^5_2)_n$, $(SiR^5_2)_n$, or $(GeR^5_2)_n$, two substituents $R^5$ on the same carbon, silicon or germanium atom can form a ring containing 3 to 8 atoms wherein n is an integer between 1 and 4;

the substituents $X^1$ and $X^2$ are hydrogen or halogen atoms, $R^6$, $OR^6$, $SR^6$, $NR^6_2$ or $PR^6_2$, where the substituents $R^6$ which can be identical or different are selected from the group consisting of $C_1$–$C_{20}$-alkyl radicals, $C_3$–$C_{20}$-cycloalkyl radicals, $C_2$–$C_{20}$-alkenyl radicals, $C_6$–$C_{20}$-aryl radicals, $C_7$–$C_{20}$-alkylaryl radicals and $C_7$–$C_{20}$-arylalkyl radicals and contain Si or Ge atoms; and the substituents $R^7$ are selected from the group consisting of hydrogen, $C_1$–$C_{10}$-alkyl radicals, $C_3$–$C_{10}$-cycloalkyl radicals, $C_2$–$C_{10}$-alkenyl radicals, $C_6$–$C_{10}$-aryl radicals, $C_7$–$C_{10}$-alkylaryl radicals and $C_7$–$C_{10}$-arylalkyl radicals and can contain Si or Ge atoms and, wherein two adjacent substituents $R^7$ form a ring having 5 to 8 carbon atoms.

8. The process according to claim 1, wherein the alumoxane is methylalumoxane.

9. The process according to claim 1, wherein the catalyst is supported on an inert support.

10. The process according to claim 9, wherein the support is a porous organic support functionalized by groups having active hydrogen atoms.

11. The process according to claim 9, wherein the organic support is a partially crosslinked styrene polymer.

12. The process according to claim 4, wherein n is 1 to 2.

* * * * *